United States Patent Office 2,810,235
Patented Oct. 22, 1957

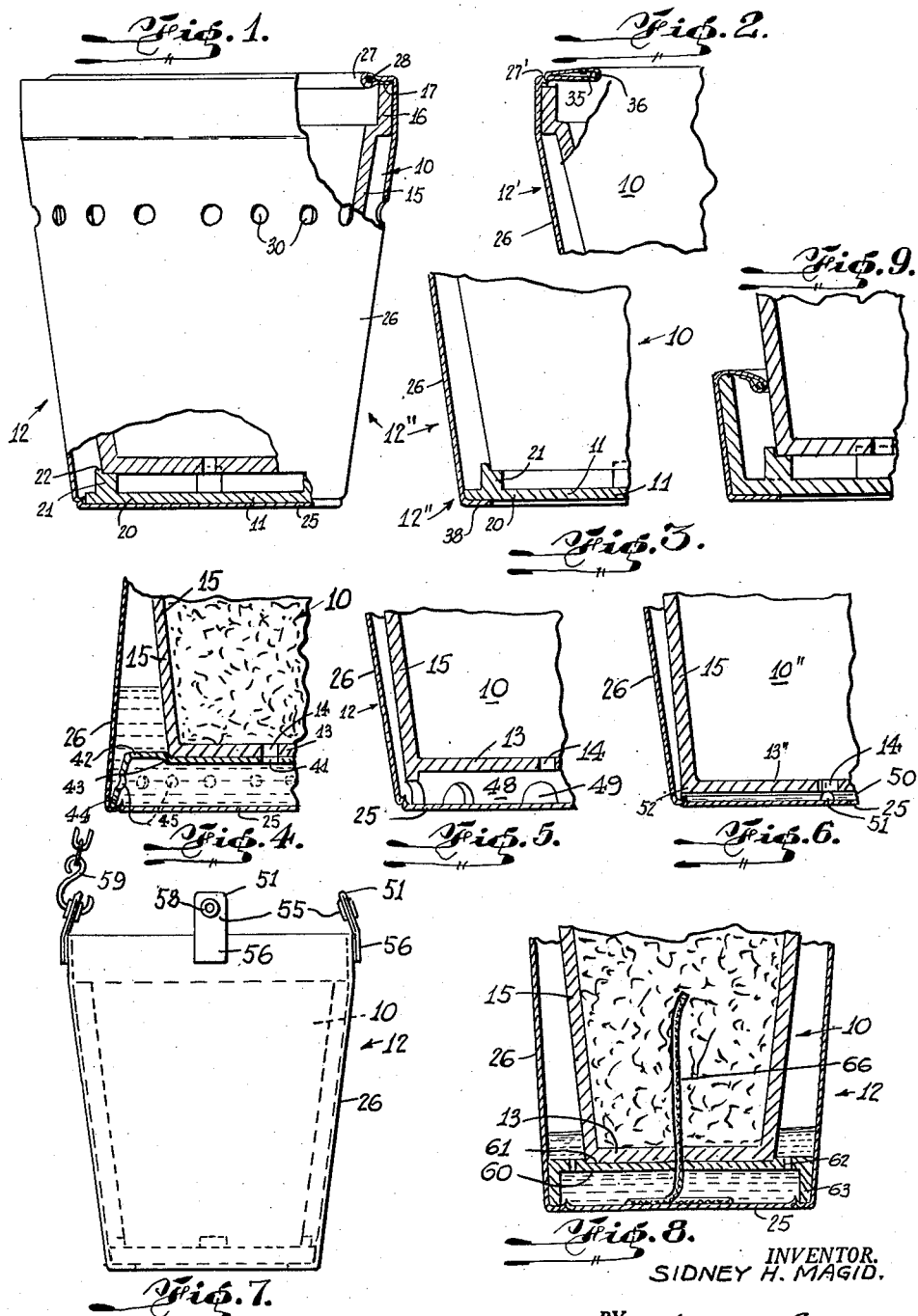

2,810,235

FLOWER POT AND JACKET FOR SAME

Sidney H. Magid, Morrisville, Pa.

Application July 13, 1953, Serial No. 367,486

1 Claim. (Cl. 47—38)

This invention relates generally to flower pot accessories, and is particularly directed to novel flower pot irrigation devices.

The particular embodiment of the present invention, which is illustrated in the drawings and which will be described hereinafter in greater detail, comprises generally a container for a flower pot and means adapted to space the container from the flower pot so that a supply of water or other liquid may be held in the space between the container and the flower pot for feeding the interior of the pot.

It is a principal object of the present invention to provide a simple and efficient means for automatically irrigating a potted plant over long periods of time. A coordinate object is to provide a device of the type described which is adapted to contain a relatively large quantity of liquid exteriorly of a flower pot and feed the liquid as required by the potted plant.

It is another object of the present invention to provide a flower pot irrigating device of the type described which enhances the attractiveness and neatness of a flower pot, and which is adapted for use with flower pots of widely varying sizes and shapes.

Still another object of the present invention is to provide a flower pot irrigating device of the type described which includes novel means to prevent splashing of dirt over the upper edges of the flower pot when the same is sprinkled or watered from above.

It is a further object of the present invention to provide a flower pot irrigating device of the type described which is simple in construction and durable in use, which is effective for its intended purposes, and which can be manufactured and sold at a reasonable cost.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

Fig. 1 is a side elevational view, partly in section, showing a device constructed in accordance with the present invention in use with a flower pot.

Fig. 2 is a fragmentary, elevational view, partly in section, and showing a slightly modified form of the present invention.

Fig. 3 is a fragmentary, sectional elevational view showing another slightly modified form of the present invention.

Fig. 4 is a fragmentary sectional elevational view showing still another modification of the present invention.

Fig. 5 is a fragmentary sectional view showing yet another slightly modified form of the present invention.

Fig. 6 is a fragmentary sectional elevational view showing a further modification of the present invention.

Fig. 7 is a side elevational view showing still another form of the present invention.

Fig. 8 is a partial, sectional elevational view showing a still further modification of the present invention.

Fig. 9 is still another form of the present invention.

Referring now more particularly to the drawings, and specifically to Fig. 1 thereof, the embodiment of the invention illustrated therein comprises a flower pot, generally designated 10, seated on a coaster 11, and a container 12 enclosing both the coaster and pot.

The flower pot 10 includes a bottom wall or closure 13 having a centrally disposed through opening or passageway 14. The bottom wall 13 is provided with a peripherally extending upwardly diverging side wall 15 including a laterally, outwardly offset upper end portion 16 which terminates in an upper edge 17.

Arranged immediately below the bottom wall 13 of the flower pot 10 is the coaster 11 which includes a substantially flat plate 20 formed with a plurality of spaced, upstanding lugs 21. Each of the lugs 21 is provided with an upwardly extending shoulder 22, which combines with the upper surface of the associated lug to seat the flower pot 10 and prevent lateral movement of the latter with respect to the coaster. Thus, the flower pot bottom wall 13 is seated on the upper surfaces of the lugs 21 in spaced relation above the coaster plate 20 and is laterally restrained with respect to the coaster. It will be noted that the coaster plate extends outwards beyond the flower pot bottom wall 13 for a purpose appearing hereinafter. While it is preferred to fabricate the flower pot 10 and coaster 11 of plastic, they may be fabricated of other materials having the required properties.

The container 12 is generally bag-like and adapted to enclose the coaster 11 and flower pot 10. The container is preferably fabricated of flexible, impermeable material, such as plastic sheeting, and includes a bottom section 25 adapted to conformably engage the undersurface of the coaster plate 20. Secured along the peripheral edge of the container bottom section is a side wall 26 which surrounds the side wall 15 of the flower pot 10 and extends upwardly and over the upper edge 17 of the pot wall portion 16. The container side wall 26 and bottom section 25 are preferably secured together by heat sealing or other waterproof means, for a purpose appearing presently. Extending along the upper edge 27 of the container side wall 26, and secured internally thereof, is an elastic core 28 which draws the upper end of the container tightly over the flower pot upper edge 17. The action of the elastic core 28 also tightens the container bottom section 25 and side wall 26. While the elastic member 28 has been illustrated as being embedded in the container 12, it is appreciated that an elastic strip may be secured along the upper edge 27 of the container exteriorly thereof to accomplish the same tightening effect. Adjacent to and spaced below the laterally offset flower pot wall portion 16, the container side wall 26 is formed with a plurality of circumferentially spaced through apertures 30.

While the container 12 is tightly drawn up by the elastic core 28, it will be noted that container bottom section 25 and side wall 26 are spaced from the flower pot bottom wall 13 and side wall 15, respectively. Thus, the interior of the flower pot 10 is in fluid communication through the passageway 14, with the space between the flower pot bottom wall 13 and coaster plate 20, and further communicates between the upstanding lugs 21 and the space intermediate the flower pot side wall 15 and container side wall 26.

In operation, the space intermediate the flower pot side wall 15 and container side wall 26 is provided with a quantity of water or other liquid plant food, which passes through the space intermediate the coaster plate 20 and flower pot bottom wall 13 and into the flower pot by way of the passageway 14. As the apertures 30 permit the ingress of air into the space above the water, and thereby prevent the formation of a vacuum, the rate of water movement into the flower pot will be automatically determined by the plant requirements. Thus, a single filling of the space intermediate the flower pot and container side walls will provide sufficient plant nourishment for a long period of time. In addition, the apertures 30 permit the evaporation of excess liquid and also may serve as an inlet for filling the reservoir with water or plant food.

It will be noted that the impermeable plastic sheeting of the container 12, and the heat sealed seams thereof combined to prevent any leakage to the surrounding area of the contained liquid. Further, the container 12 may be decorated or embellished in any desired manner to enhance and conceal the appearance of the flower pot and coaster; and as the container 12 is drawn tightly about the flower pot and coaster, it presents a neat and unitary appearance.

A frequent objection to both indoor flowerpots and windowbox flower pots is that of dirt or mud splashing occasioned either by manual sprinkling or rain water. That is, the falling water causes mud to jump over the upper edge of the flower pot to soil window panes and other objects in the surrounding area. In order to cure this objection, the container 12' of Fig. 2 has its upper edge 27' provided with a peripherally extending flange or extension 35 which extends inwardly a substantial distance over the dirt or soil contained in the flower pot 10. The extension 35 is preferably heat-sealed to the container upper edge 27' and is provided with an elastic core 36 adjacent its inner edge. As the flange or extension 35 is preferably fabricated of flexible material such as that employed for the container 12', the elastic core 26 draws the extension substantially horizontally inwardly to overlie the interior of the flower pot. As almost all splashing necessarily takes place adjacent to the side wall portion 16 of the flower pot, it will be understood that the flange or extension 35 will substantially completely eliminate such splashing.

In Fig. 3 is shown a slightly modified form of the present invention, wherein the container bottom section 25 of Fig. 1 is eliminated. The side wall 26" of the container 12" has a peripheral extension 38 on its lower end which underlies the edge margin of the coaster plate 20. The peripheral extension 38 may be secured to the coaster plate 20 by any water-tight securing means, so that the coaster 11 forms the lower end closure for the container 12". In operation, the modification of Fig. 3 is substantially identical to that of Fig. 1. However, the assembly of the flower pot 10 with the container 12" and coaster 11 is simplified as the coaster forms a permanent part of the container.

In Fig. 4 a slightly modified form of the coaster 11' is illustrated. The coaster 11' includes a substantially flat plate 40 adapted to engage undersurface of the flower pot bottom wall 13 and is provided with a through aperture 41 in registry with the passageway 14. The peripheral margin of the coaster plate 40 is embossed as at 42 to form a shoulder 43 which restrains the lateral movement of the pot 10 with respect to the coaster 11'. A downwardly and outwardly extending peripheral flange 44 is formed on the edge portion 42 of the coaster 11', and is provided with a plurality of circumferentially spaced through apertures 45. It will be seen that the peripheral flange 44 retains the bottom section 25 of the container 12 and the side wall 26 of the container in spaced relation, respectively, with the plate 40 of the coaster 11' and the side wall 15 of the flower pot 10, thus providing space for a supply of liquid plant food or the like. As the apertures 45 communicate between the space intermediate the container side wall 26 and flower pot side wall 15 and the space intermediate the container bottom section 25 and plate 40, it is seen that liquid may be fed from the first-mentioned space through the latter and thence through the apertures 41 and 14 into the flower pot 10. Thus, the operation of the device of Fig. 4 is substantially identical to that of the device of Fig. 1.

In Fig. 5 is shown a modification of the present invention wherein the use of a coaster is completely eliminated. The bottom wall 13 of the flower pot 10' is provided with a vertically depending peripheral flange 48 which has a plurality of spaced cutout portions 49. It will be noted that the depending flange 48 is at an angle with respect to the flower pot side wall 15 so that the container side wall 26 is spaced from the flower pot side wall. The bottom section 25 of the container 12 is held against the lower edge of the flange 48 and thus spaced from the flower pot bottom wall 13. The cutouts or openings 49 permit the passage of liquid from the space intermediate the container and flower pot side walls 26 and 15, respectively, to the space intermediate the flower pot bottom wall 13 and container bottom section 25, and thence through the passageway 14 to the flower pot interior.

Another form of the present invention which eliminates the need for a coaster is shown in Fig. 6. The flower pot bottom wall 13" is formed with spaced thickened wall portions 50, 50 which are arranged in spaced relation with each other to define therebetween grooves 51. The grooves 51 extend inwardly from the periphery 52 of the bottom wall 13' to the passageway 14. It will be noted that the peripheral edge 52 of the bottom wall 13" is substantially cylindrical in configuration and, therefore, at an angle with respect to the side wall 15 of the flower pot 10". Thus, the side wall 26 of the container 12 is spaced from the side wall 15 of the flower pot 10", as described in connection with the modification of Fig. 5. The grooves 51 will then communicate between the space intermediate the container side wall 26 and flower pot side wall 15, and the passageway 14 to permit the flow of liquid into the flower pot 10".

Stated in another way, the flower bottom wall 13" is provided in its undersurface with a plurauity of radially disposed grooves 51 which open through the bottom wall peripheral edge 52 and into the passageway 14. The container bottom section 25 is drawn tightly across and in engagement with the undersurface of the flower pot bottom wall 13" and combines with the grooves 51 to provide passageways communicating between the space intermediate the container side wall and flower pot side wall 15 and the passageway 14.

In Fig. 7 is illustrated another modification of the present invention wherein the container 12 adjacent to the upper end of the flower pot 10 is provided with a plurality of circumferentially spaced upwardly projecting tabs 55. The tabs 55 have their lower portions 56 secured to the container side wall 26 by any suitable means, the upper tab portions 57 each being provided with an eyelet 58 for receiving a hook 59 or the like. Thus, the tabs 55 serve as means for suspending the container 12, flower pot 10 and coaster 11 from an overhead support (not shown).

In Fig. 8 is shown another slightly modified form of the present invention, wherein a coaster 11" includes a plate 60 having its upper surface recessed as at 61 to conformably seat the lower end 13 of the flower pot 10. The plate 60 extends laterally beyond the bottom wall 13 of the flower pot and is provided with a plurality of circumferentially spaced through openings 62 outwardly of the flower pot. A depending peripheral flange 63 is formed on the coaster plate 60 to space the bottom section 25 of the container 12 away from the plate 60.

When liquid is contained in the space between the container side wall 26 and the flower pot side wall 15, and in the space between the coaster plate 60 and the container bottom section 25, the liquid will automatically feed the interior of the flower pot according to the requirements of the plant. However, when the liquid level is below that of the flower pot bottom wall, such feeding will not occur. In order to continue irrigation of the soil 65 after the liquid level has receded below that of the soil, a wick 66 has one end submerged in the liquid below the coaster plate 60 and extends upwardly through the coaster plate and flower pot bottom wall and into the soil 65. With this arrangement, it has been found that capillary action will effect movement of the liquid by means of the wick through the passageway 14 and into the soil 65.

From the foregoing, it is seen that the present invention fully accomplishes its intended objects and is well adapted to meet practical conditions of use.

Although the present invention has been described in some detail by way of illustration and example for purposes of clarity of understanding, it is understood that certain changes and modifications may be made within the spirit of the invention and the scope of the appended claim.

Having thus described my invention, what I claim as new and desire to secure by Letters Patent, is:

In combination, a flower pot having a closed bottom and an open top and formed with a through passageway in said bottom, a flexible container fabricated of impermeable material and having a closed bottom and an open top, said container enclosing said pot and having its upper end overlying the upper edge of said pot and comprising a flexible contractible ring to retain said container in position, means intermediate the lower end of said pot and container for spacing the latter from said pot, whereby fluid may be held in the space intermediate said container and pot for movement through said passageway, the upper end of said container extending horizontally inwardly beyond the upper edge of said pot to provide a splash guard, said container being provided with radial openings through its side wall adjacent to its upper end, to permit the ingress of air between the container and pot as the liquid moves into the pot and prevent the formation of a vacuum in the space previously occupied by said liquid, said openings also serving for the admission of plant food and water.

References Cited in the file of this patent
UNITED STATES PATENTS

| | | |
|---|---|---|
| 320,588 | Rhoads | June 23, 1885 |
| 1,712,986 | Favata | May 14, 1929 |
| 1,994,962 | Rushfeldt | Mar. 19, 1935 |
| 2,076,450 | Doty | Apr. 6, 1937 |
| 2,253,817 | Simmons | Aug. 26, 1941 |
| 2,344,794 | Vallinos | Mar. 21, 1944 |
| 2,585,214 | Belmont | Feb. 12, 1952 |
| 2,605,588 | Lindstaedt | Aug. 5, 1952 |